(12) United States Patent
Stinnett et al.

(10) Patent No.: US 6,494,514 B1
(45) Date of Patent: Dec. 17, 2002

(54) COMBINED MANURE FORK AND SHAVINGS BLOWER

(76) Inventors: Rosemarie Stinnett, 880 W. Highland Dr., Camarillo, CA (US) 93010; Lee Stein, 880 W. Highland Dr., Camarillo, CA (US) 93010

( * ) Notice: Subject to any disclaimer, the term of this patent is extended or adjusted under 35 U.S.C. 154(b) by 0 days.

(21) Appl. No.: 09/939,257

(22) Filed: Aug. 27, 2001

(51) Int. Cl.$^7$ ................................................. A01D 9/00
(52) U.S. Cl. ........................... 294/59; 294/51; 294/55.5; 15/405
(58) Field of Search ........................... 294/49, 50, 50.5, 294/51, 55.5, 57, 59; 7/114–116; 15/344, 405, 410; 56/400.01, 400.04, 400.08

(56) References Cited

U.S. PATENT DOCUMENTS

| | | | | |
|---|---|---|---|---|
| 243,098 A | * | 6/1881 | Becker et al. ............. | 15/415.1 |
| 954,260 A | * | 4/1910 | Davis ........................... | 15/339 |
| 1,075,459 A | * | 10/1913 | Bowman ...................... | 111/7.4 |
| 1,747,258 A | * | 2/1930 | O'Neil ......................... | 111/7.1 |
| 2,638,730 A | * | 5/1953 | Davidson ..................... | 111/7.1 |
| 4,628,674 A | * | 12/1986 | Dougan ........................ | 16/422 |
| 4,945,604 A | * | 8/1990 | Miner et al. .................. | 15/344 |
| 5,054,159 A | * | 10/1991 | Richardson .................. | 15/393 |
| 5,791,706 A | * | 8/1998 | Dolci ........................... | 294/51 |
| 5,991,973 A | * | 11/1999 | Simpson ...................... | 15/344 |

* cited by examiner

Primary Examiner—Dean J. Kramer
(74) Attorney, Agent, or Firm—J. E. McTaggart

(57) ABSTRACT

For conserving bedding material such as wood shavings when cleaning livestock environments such as horse stalls, a manure fork is combined with an air blower directed into the working region of the fork. The air flow is directed to blow the loose bedding material past the fork tines and onto surrounding regions of the stall automatically, while the worker simply works with the fork in the normal manner to remove the manure. The bedding material remains in the stall, thus saving a substantial portion of the usual replenishment costs. The invention thus accomplishes substantial overall cost savings and environmental conservation without requiring special supervision or unusual diligence on the part of the worker.

8 Claims, 4 Drawing Sheets

COMBINED MANURE FORK AND SHAVINGS BLOWER

FIELD OF THE INVENTION

The present invention relates to the field of hand-held material-handling implements and more particularly to an improvement in manually-deployed forks for cleaning livestock facilities such as horse stables.

BACKGROUND OF THE INVENTION

Manual cleaning of horse stalls or other livestock facilities, as conventionally practiced, is typically performed utilizing a commercially-available specially-shaped fork as shown in plan view in FIG. 1A, side view in FIG. 1B and three-dimensional view in FIG. 1C. Fork 10 consists of a scoop portion 12 configured with a row of tines extending as shown, typically molded from plastic. A handle 14, typically made of wood with a circular cross-sectional shape, is attached to scoop portion 12.

In conventional practice of stall cleaning, there is substantial waste because much of the wood shaving bedding material becomes removed and discarded along with the manure, thus necessitating frequent costly replenishment that can amount to many bags of shavings per week per animal, representing a substantial cost factor.

The main approach presently available to control this cost factor is to train, motivate and supervise workers to take the extra time and diligent effort to salvage the wood shavings; however such special training and effort is likely to be merely a tradeoff, shifting the cost to labor and supervision, and could result in zero or negative savings overall. The cost of wasted bedding material is particularly high in prestigious operations and expensive boarding sites where the stalls must be kept in top condition by frequent cleaning and where wood shavings are utilized plentifully for aesthetic and show purposes.

OBJECTS OF THE INVENTION

It is a primary object of the present invention to provide an improved manure fork for cleaning livestock stalls and pens, that automatically separates bedding material such as wood shavings during the process of stall cleaning so that the bedding material can be retained and recycled repeatedly.

It is a further object that any mechanism incorporated in the improved manure fork be made to operate in a manner that there is no excessive sound or other disturbance that could frighten or alarm nearby livestock.

It is a further object that the improved manure fork be made to operate safely without requiring an AC power line cord and without exposing the user or livestock to risk of electrical shock.

It is a further object that any motor driven mechanism including associated batteries be sufficiently small and light in weight so as not to appreciably increase the work effort normally required in conventional stall-cleaning activity.

SUMMARY OF THE INVENTION

The present invention combines a manure fork with an air blower that is directed in a manner to blow bedding material such as wood shavings off the fork and back into surrounding regions of the stall automatically while the worker simply performs the cleaning operation and removes the manure in the normal manner. The wood shavings are then easily recycled into the stall, thus saving a substantial portion of the conventional replenishment costs without imposing extra diligence on the part of the worker or extra supervision on the part of the supervisor.

Electrical powering of the blower keeps the operation quiet so as to not alarm the horse or other livestock. Instead of operating the blower from the AC power line, on-board battery operation is utilized to avoid the potential nuisance factor of an AC line cord and to eliminate any risk of electrical shock.

BRIEF DESCRIPTION OF THE DRAWINGS

The above and further objects, features and advantages of the present invention will be more fully understood from the following description taken with the accompanying drawings in which:

FIG. 3 is a three-dimensional view of the blower-equipped fork of

FIGS. 2A–2C, shown as typically deployed by a worker.

DETAILED DESCRIPTION

Figure 1A:
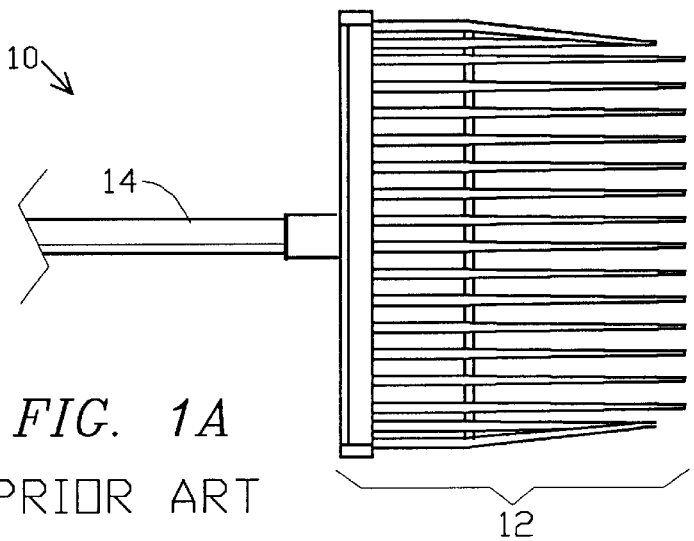
FIG. 1A is a plan view of a manure fork of known art used for cleaning stalls.
Figure 1B:
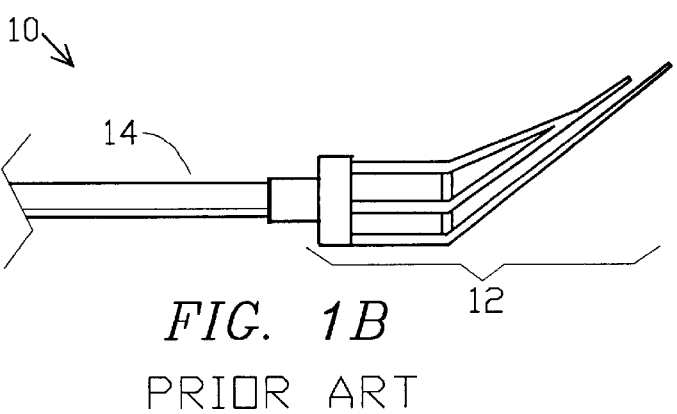
FIG. 1B is a side view of the fork of FIG. 1A.
Figure 1C:
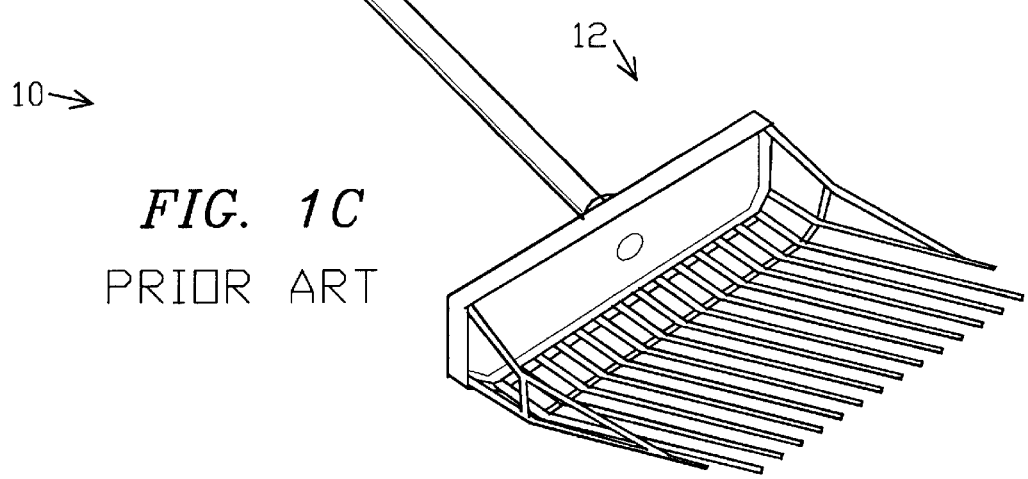
FIG. 1C is a perspective view of the fork of FIGS. 1A and 1B.

FIGS. 1A, 1B and 1C show plan, side and perspective views respectively of a typical conventional manure fork 10 of known art as discussed above, having a scoop portion 12 with a handle 14 attached.

Figure 2A:
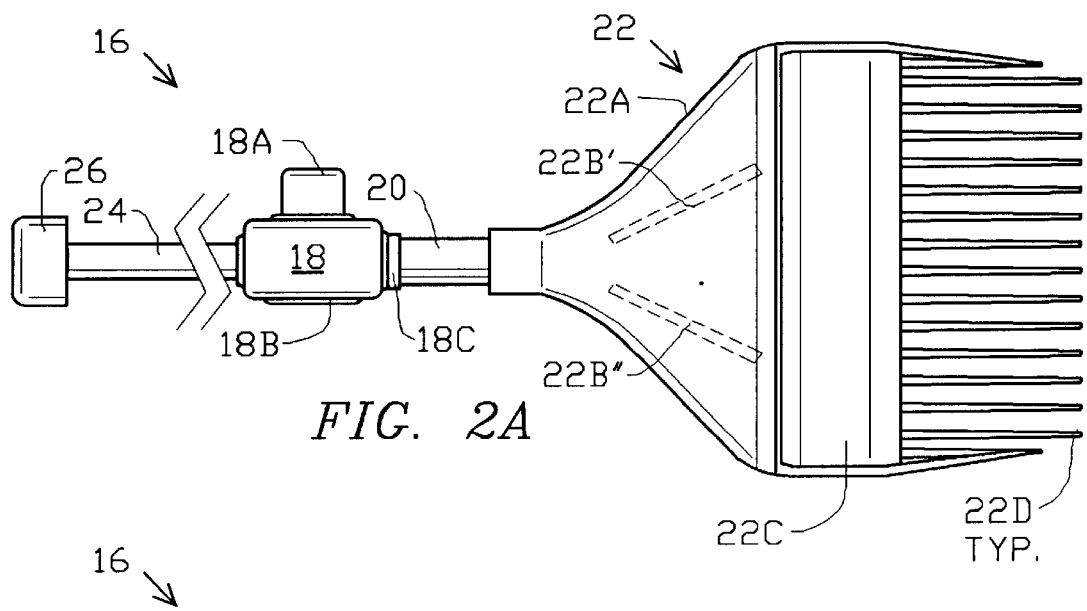
FIG. 2A is a plan view of a manure fork combined with a blower and a battery, in a preferred embodiment of the present invention, shown with the handle foreshortened.

In FIG. 2A, an improved manure fork 16 is shown in plan view illustrating a preferred embodiment of the present invention. Fork 16 is equipped with an air blower 18 having an electric motor 18A on one side and an air intake 18B on the opposite side. The air outlet 18C of blower 18 is connected via a tubular air conduit 20 to a scoop portion 22, which is configured with a flared air duct 22A and a set of tines 22D which are generally of same shape as the tines 12A of the conventional fork of FIGS. 1A–C. The flared air duct 22A is configured internally with a pair of vanes 22B' and 22B", shown in dashed lines, positioned to deflect the flow of air outwardly to distribute the air flow uniformly across the width of the outlet region of duct 22A and thus blow loose particles such as wood shavings beyond the end of the tines 22D.

At the upper side as shown, blower 18 is fitted a tubular handle 24, which is shown foreshortened for illustrative purposes, and which may be made of metal such as steel or aluminum. Handle 24 may be attached to blower 18 by welding or by a sleeved adaptor flange. Attached to the end of handle 24 is a battery pack 26, preferably of the commercially available rechargeable gel type of suitable voltage: typically in a range from 9 to 18 volts. Within the tubular handle 24, a pair of electrical wires connect the battery pack 26 to the motor 18A.

Battery pack 26 may be attached to handle 24 in a frictional or locking manner and may be fitted with an electrical connector that allows convenient removal for recharging.

Optionally motor 18A may be fitted with an electrical connector that allows easy disconnection for service purposes.

Figure 2B:
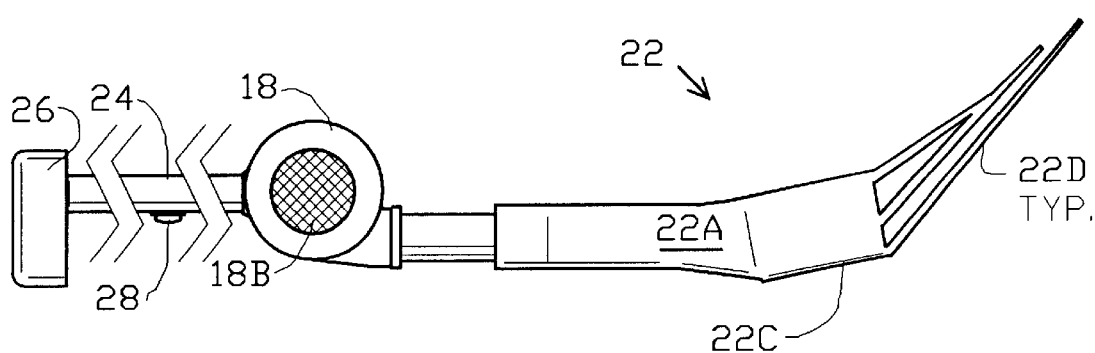
FIG. 2B is a side view of the blower-equipped fork of FIG. 2A.

FIG. 2B is a side view of the fork 16 of FIG. 2A showing baffle 22C disposed at an angle relative to the bottom side of duct 22A, such that the flow of air from conduit 20 is deflected upwardly so as to blow wood shavings beyond the ends of the tines 24D, where they will drop off for recycling.

On the underside of tubular handle 24, shown foreshortened, is mounted a switch 28 of the momentary, normally open, pushbutton type, connected in series with one of the electrical wires within handle 24 so as to enable finger control of the blower 18.

The air intake 18B of blower 18 is seen to be fitted with a protective screen or grill.

Figure 2C:
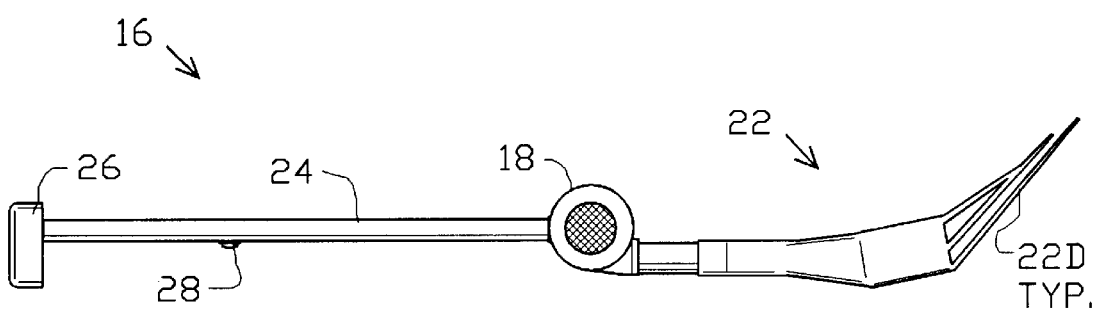
FIG. 2C is a side view of the blower-equipped fork of FIGS. 2A and 2B in reduced scale showing the handle in full.

FIG. 2C shows the side view of FIG. 2B in a smaller scale, showing the handle 24 in full and showing the relative location of pushbutton switch 28.

Air blower 18 is preferably of the centrifugal type; it is made to respond immediately to closing of pushbutton switch 28 by producing a blast of air across the fork tines 22D sufficient to blow wood shavings off past the end of tines 22D.

Figure 3:
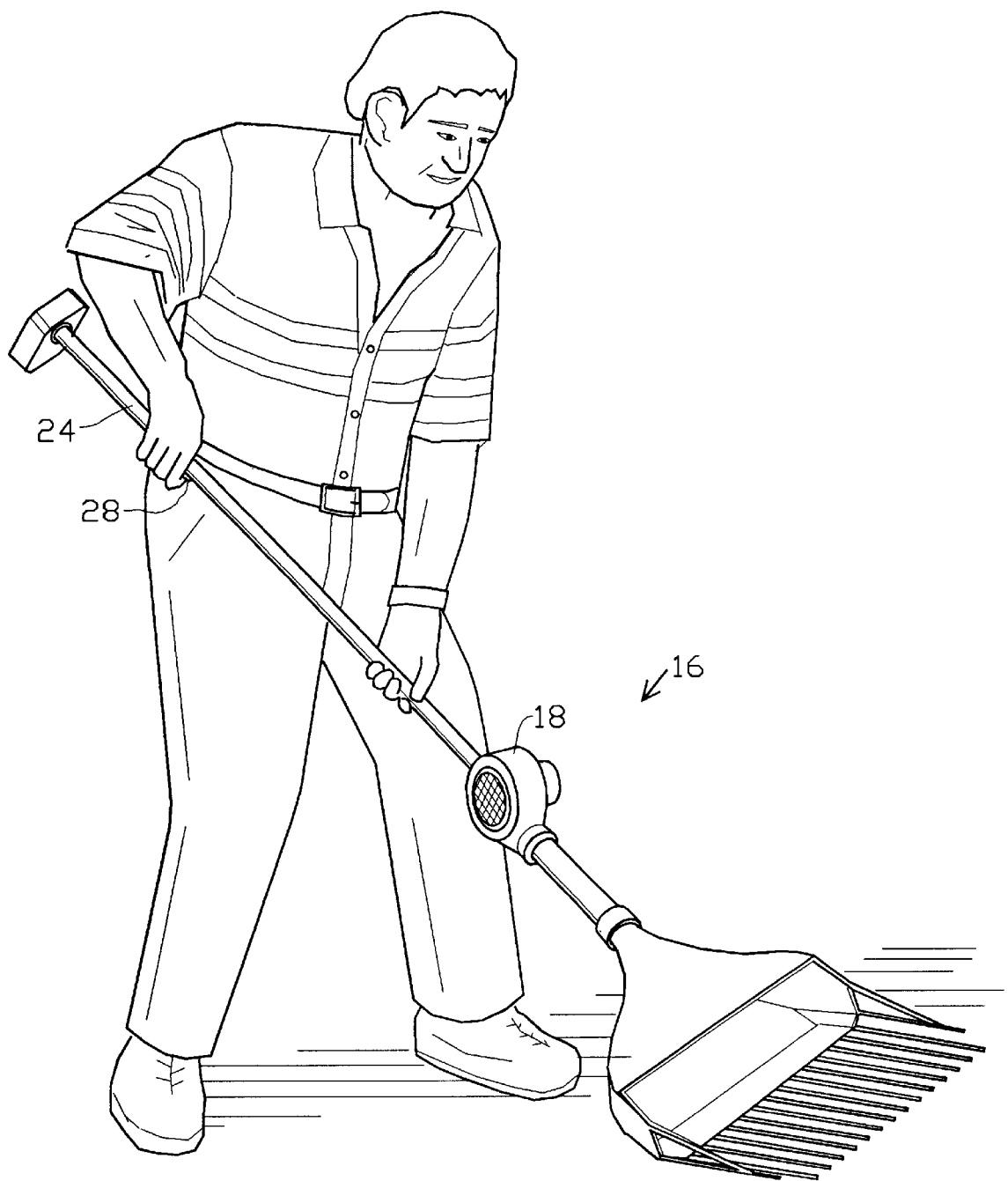

FIG. 3 is a three-dimensional view depicting the blower-equipped manure fork 16 of FIGS. 2A and 2B as it would be typically deployed by a worker cleaning livestock stalls, grasping the handle 24 in both hands in the usual manner, but with a finger of one hand on pushbutton switch 28 so that the blower 18 can be energized intermittently as required.

Figure 4A:
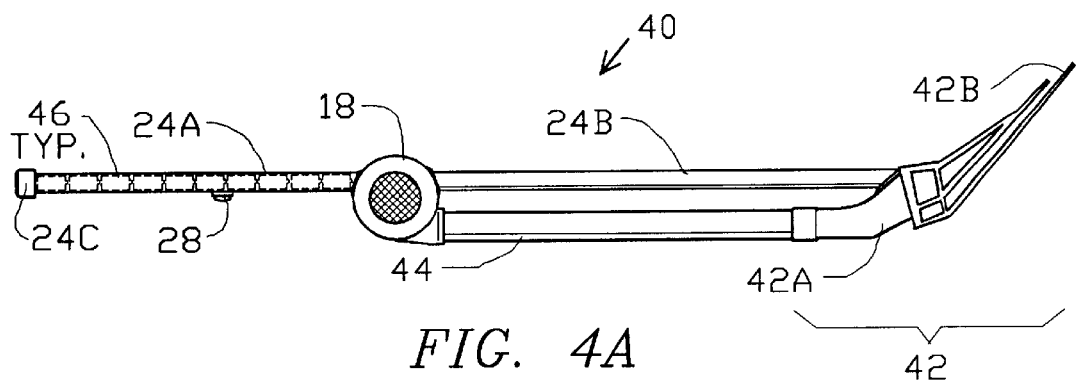
FIG. 4A is a side view of blower-equipped fork illustrating a second embodiment of the invention.

In this embodiment, as a matter of design choice, the blower 18 could be located closer to the scoop portion 22 than shown in FIGS. 2A–3: conduit 20 could be shortened or even eliminated, particularly if the blower and motor are made light in weight FIG. 4A is a side view of an alternative embodiment of the invention where, in addition to handle portion 24A, a second handle portion 24B extends from the opposite side of the blower 18 to the scoop portion 42, along with air conduit 44 offset beneath by a separation distance that provides a finger space.

At the other end of conduit 44, the flared duct 42A is curved upwardly as shown so as to redirect the air flow in the most effective direction to blow loose material over the tines.

Shown in this embodiment, but not restricted thereto, as an alternative to the battery pack 26 located at the end of handle as shown in FIGS. 2A–3, a row of cylindrical battery cells 46 may be located inside handle 24 as shown by dashed lines. The cells 46 are operated in series and are made accessible by a removable cap 24C threaded onto the end of handle 24A, essentially in the manner of well-known flashlights.

Figure 4B:
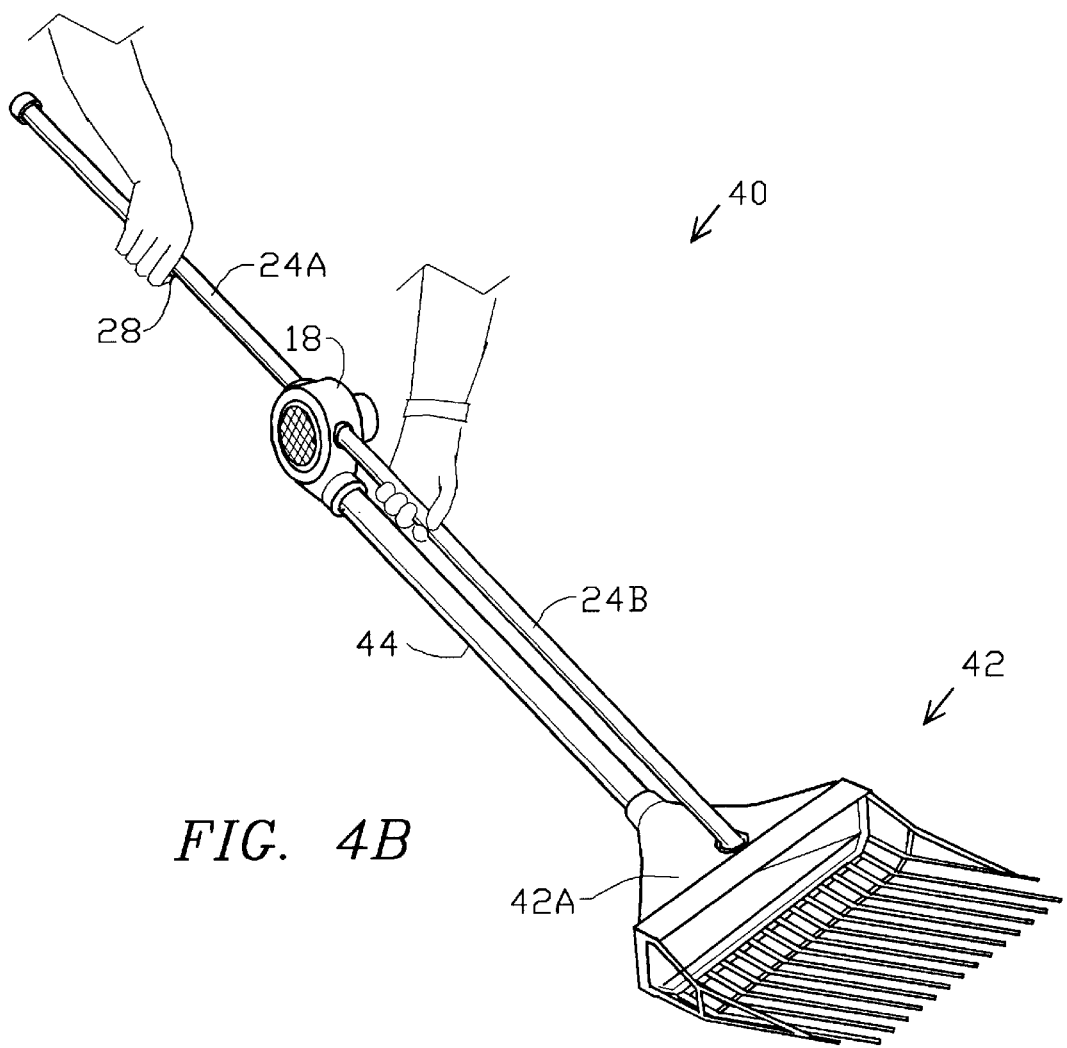
FIG. 4B is a perspective view of the fork of FIG. 4A.

FIG. 4B shows a three-dimensional view of the blower-equipped fork of FIG. 4A as it would be held in use with one hand grasping handle portion 24A with a finger on pushbutton switch 28, and the other hand grasping handle portion 24B. Since the blower 18 is located between the two hands as shown, its weight becomes distributed between the two arms. This configuration can reduce or eliminate the requirement for a solid baffle (22C, FIG. 2B) and/or can increase the area of open strainer portion at the base of the tines.

In any embodiment of the invention, for convenience of battery recharging, a commercially available charger can be made and arranged to conveniently contact and charge the battery pack in place from the AC power line between usage events in the well manner of well-known recharging cordless tools such as hand drills and power screw drivers.

While the described embodiments show a single blower, the invention could be practiced with two or more blowers combined with the fork.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A combined manure fork and air blower, directed to conservation of bedding material in cleaning of livestock environments, comprising;

a scoop portion of the fork configured with a row of times;

at least one powered air blower implemented as a centrifugal air impeller driven by an electric motor disposed fixedly relative to the scoop portion, made and arranged to generate a sufficient flow of air directed to blow loose livestock bedding material beyond the row of tines;

a handle, disposed fixedly relative to the air blower and the scoop portion, made and arranged to enable a worker to manipulate the scoop portion in a conventional manner for cleaning the livestock environments; and a rechargeable battery pack attached to an end of the handle opposite an end thereof attached to the air blower, constituting an onboard battery power supply providing electrical power to the motor.

2. The combined manure fork and air blower as defined in claim 1 wherein the scoop portion comprises;

a flared air duct having an intake receiving air from the air blower; and an outlet of substantially greater width than that of the intake, made and arranged to direct the flow of air over the row of tines.

3. The combined manure fork and air blower as defined in claim 2 wherein the flared air duct further comprises a plurality of vanes disposed internally therein, made and arranged to distribute air flow uniformly across the width of the outlet.

4. The combined manure fork and air blower as defined in claim 2 further comprising a tubular air conduit connected between the air blower and the intake of the flared air duct.

5. The combined manure fork and air blower as defined in claim 1 further comprising a manually operable on-off switch, mounted in the handle, made and arranged to permit a user to conveniently control operation of the motor.

6. The combined manure fork and air blower as defined in claim 1 further comprising electrical connection means for recharging the battery pack in place on the end of the handle.

7. The combined manure fork and air blower as defined in claim 1 further comprising attachment and connector means for readily removing the battery pack from the handle for recharging purposes.

8. The combined manure fork and air blower as defined in claim 1 wherein the onboard battery power supply comprises a row of cylindrical battery cells disposed within the handle.

* * * * *